July 14, 1931.   W. RHODES   1,814,093
POWER DRIVEN HOLE DIGGER
Filed Nov. 14, 1927   3 Sheets-Sheet 1
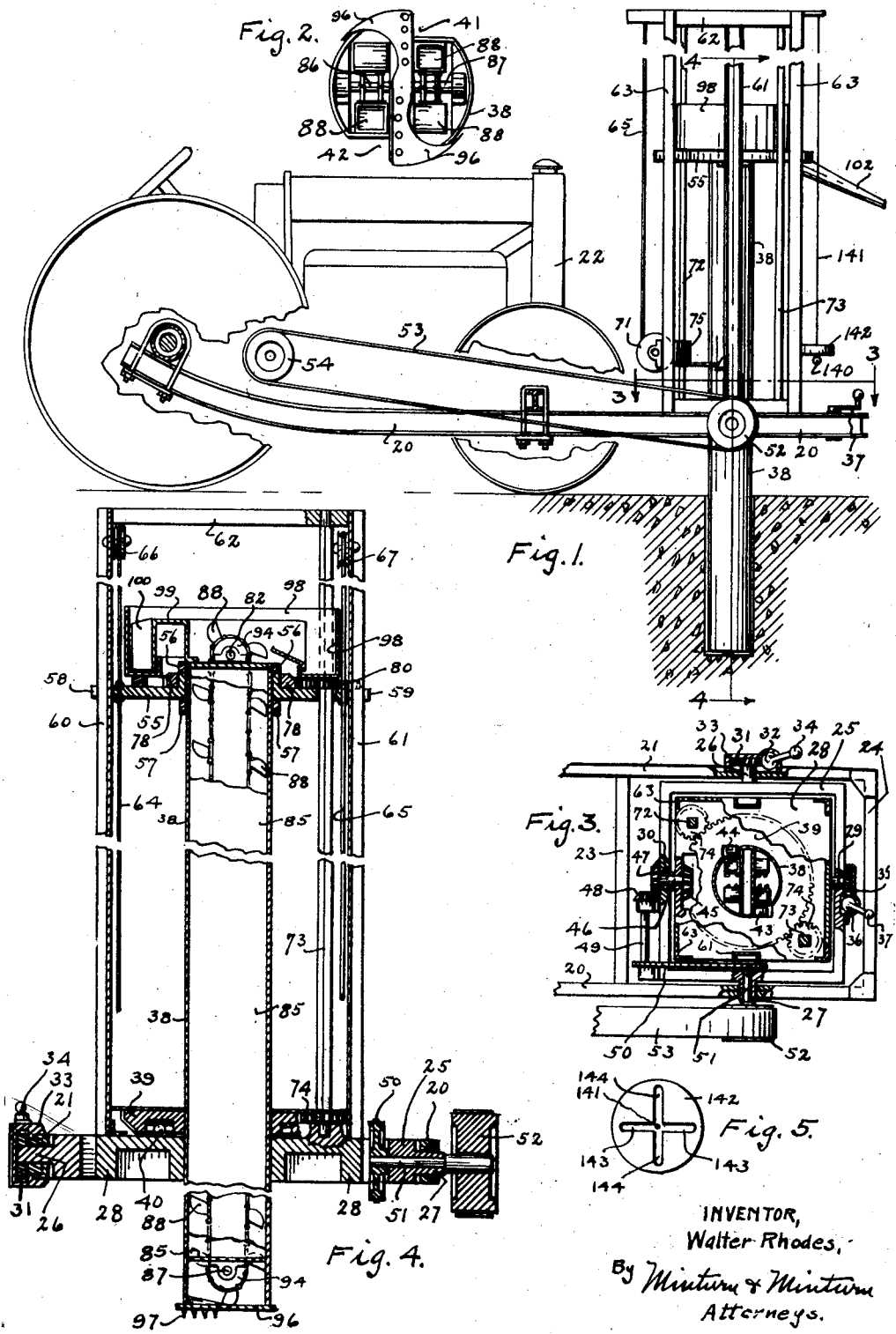

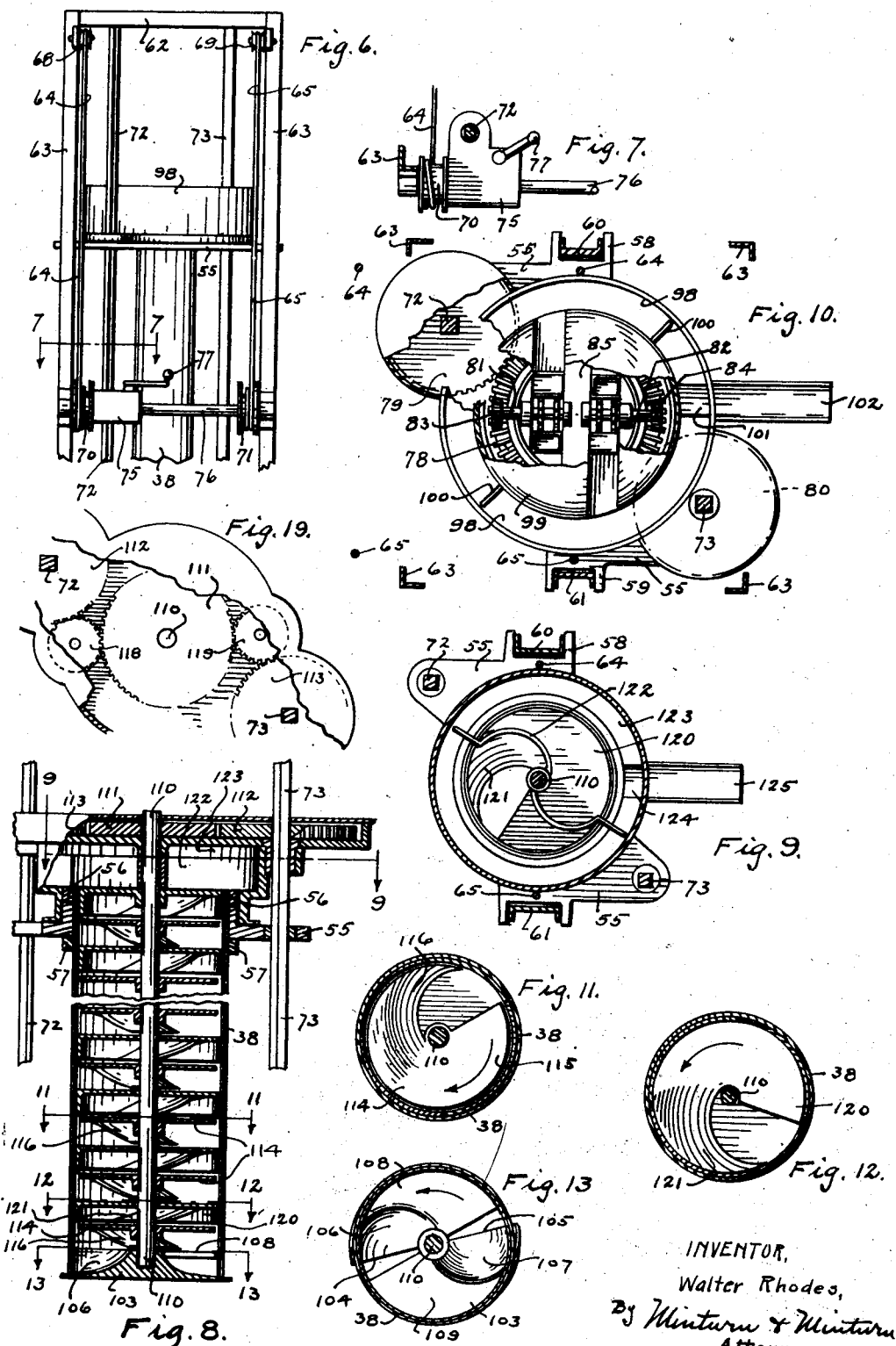

July 14, 1931.  W. RHODES  1,814,093
POWER DRIVEN HOLE DIGGER
Filed Nov. 14, 1927  3 Sheets-Sheet 3
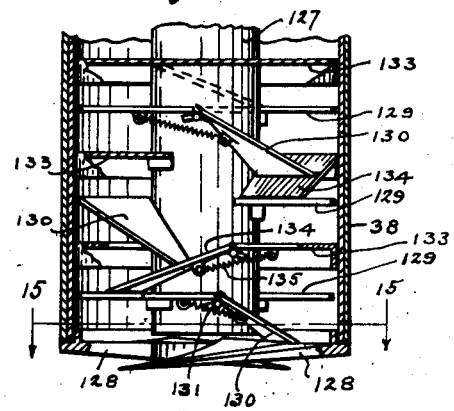
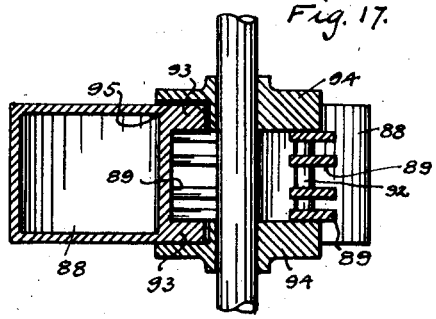
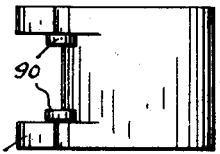
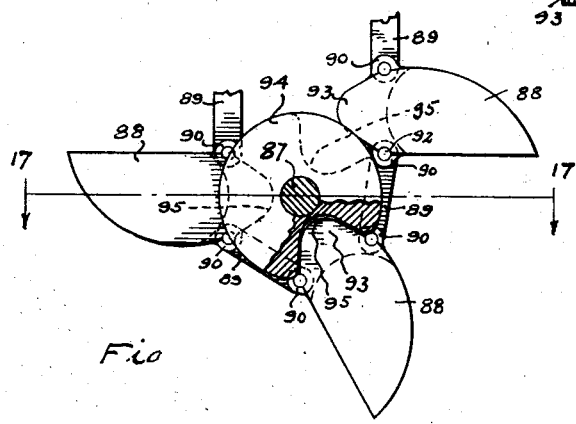
INVENTOR,
Walter Rhodes,
By Minturn & Minturn,
Attorneys.

Patented July 14, 1931

1,814,093

UNITED STATES PATENT OFFICE

WALTER RHODES, OF TERRE HAUTE, INDIANA

POWER DRIVEN HOLE DIGGER

Application filed November 14, 1927. Serial No. 233,151.

This invention relates to means for digging holes in the earth to receive fence posts, telephone poles and the like, and relates in particular to a power driven mechanism that may be attached to a tractor or truck to receive power therefrom and to be quickly transported form hole to hole thereby.

I am aware of the fact that there are certain other types of power driven hole diggers, but they are not of a continuous operating type in that they must alternately bore into the ground and then be elevated to bring out the loosened dirt. With my invention, the digger is operated continuously and all dirt is elevated as loosened and deposited on the surface of the earth at the side of the hole without having to stop the boring operation.

The invention is described with reference being made to the accompanying drawings, in which Fig. 1 is a side elevation of my hole digger in attached relation to a tractor;

Fig. 2 an enlarged bottom plan view of the boring cylinder;

Fig. 3 a horizontal section on the line 3—3 in Fig. 1;

Fig. 4 an enlarged vertical section on the line 4—4 in Fig. 1;

Fig. 5 a top plan view of the alining indicator;

Fig. 6 a rear elevation of the upper portion of the digger;

Fig. 7 a horizontal section on the line 7—7 in Fig. 6, showing a top plan view of the cylinder elevating control;

Fig. 8 an enlarged vertical section through the digger showing a modified form from that in Fig. 4;

Fig. 9 a transverse section on the line 9—9 in Fig. 8;

Fig. 10 a fragmentary top plan view of the modified form as shown in Fig. 8;

Fig. 11 a transverse section on the line 11—11 in Fig. 8;

Fig. 12 a transverse section on the line 12—12 in Fig. 8;

Fig. 13 a transverse section on the line 13—13 in Fig. 8;

Fig. 14 a fragmentary vertical section of the lower end of the digger cylinder, showing a modified form of dirt elevating means on an enlarged scale;

Fig. 15 a transverse section on the line 15—15 in Fig. 14;

Fig. 16 a fragmentary side elevation of the lower end of the bucket digging and elevating mechainsm on a greatly enlarged scale;

Fig. 17 a horizontal section on the line 17—17 in Fig. 16;

Fig. 18 a bottom plan view of one of the buckets; and

Fig. 19 a fragmentary top plan of the gear device of the modified form as shown in Fig. 8.

Like characters of reference indicate like parts throughout the several views of the drawings.

Referring first to Figs. 1, 3, and 4, a supporting frame is formed by the two side rails 20 and 21 which are passed back under and detachably bolted to the axles of the tractor 22, and the two spaced transverse members 23 and 24 which tie the side rails together at their forward ends and which extend considerably ahead of the tractor just above the ground.

Between the side members 20 and 21, within the space between the transverse members 23 and 24, is pivoted a frame 25, by the solid trunnion 26, and the hollow trunnion 27 so as to permit the frame 25 to revolve on the trunnions on an axis transversely of the side members.

A platform 28 is pivoted within the frame 25 by the solid trunnion 29 and the hollow trunnion 30 so as to revolve on an axis normal to that about which the frame 25 revolves, the axes of both the frame 25 and the platform 28 lying in the same plane.

To control and adjust the angle of the frame 25 with the side members 20 and 21, a worm wheel 31 is secured on the end of the solid trunnion 26 which projects through the side rail 21, and a worm 32 supported within the housing 33, which is attached to the rail 21, engages with the wheel 31 and has a crank 34 to turn it therewith. The frame 25, being rocked by turning the crank 34, carries the platform 28 with it, and to rock the platform, a worm wheel 35 is secured on the end of the solid trunnion 29 and a worm 36 revolvably carried on the frame 25 engages with and causes the wheel to revolve by the turning of the crank 37 secured to the worm 36.

A boring cylinder 38 is passed through and slidingly guided by the platform 28, Fig. 4. This cylinder 38, is hollow, has a length somewhat greater than the depth of the hole to be dug, and its diameter is slightly less than that of the hole. A ring gear 39 surrounds the cylinder and is carried on the platform on ball bearings 40. The gear 39 is free to revolve on the platform 28, and the cylinder 38 is free to slide vertically through the ring gear. The revolving of the gear 39 carries the cylinder 38 around with it at any elevation of the cylinder. To permit this operation, the cylinder 38 is formed with two, diametrically opposite chordal slots 41 and 42, (see Fig. 2) and the ring gear 39 carries rollers 43 and 44 (Fig. 3) which engage against the corresponding faces of the slots to revolve the cylinder with the gear even though the cylinder be sliding through the gear during the revolution of the gear.

The ring gear 39 is driven by the small bevel gear 45 meshing with the bevel teeth on the under side of the gear 39, and the gear 45 is carried on the shaft 46 which is passed through the hollow trunnion 30 and carries the outer gear 47 which in turn meshes with the gear 48 on the shaft 49 carried on the frame 25, and which shaft 49 is driven by the chain 50 from the shaft 51 over sprockets, which shaft 51 is carried in the hollow trunnion 27. The shaft 51 projects through the trunnion 30 outwardly beyond the side rail 20 to carry the pulley 52 which is driven by the belt 53 from the tractor pulley 54.

The upper end of the cylinder 38 is revolvably carried in the guide plate 55 by a ring 56 secured to the cylinder 38 above and a ring 57 secured to the cylinder below the plate 55. The plate 55 is slidingly guided by the yokes 58 and 59 engaging with the guides 60 and 61 which are vertically positioned on the platform 28 and engaged by their top ends by the top frame 62 which is further carried by the corner angles 63.

An alining device is provided in the form of a plumb bob 140 (Figs. 1 and 5) which hangs from the frame 62 to have its supporting string 141 pass through the plate 142 which carries the two slots 143 and 144 therethrough. The plate 142 is carried between the two corners 63 and located so that when the cylinder 38 is vertically disposed the string 141 will be at the center of the intersection of the slots 143 and 144. Any deviation from the vertical line will be indicated by the string being pulled into the corresponding slot by the bob 140, and the deviation can be corrected by turning the cranks 34 and 37 as may be required.

To raise and lower the cylinder 38, a pair of cables 64 and 65 are provided, one end of each of which is secured to the plate 55 near the guides 60 and 61, respectively, the cables then carried up over the pulleys 66 and 67, out over the pulleys 68 and 69, down to the drums 70 and 71, wrapped around the drums, then across to the guides 60 and 61 and thence back up to and secured to the plate 55, each to form, in effect, a continuous cable with the plate 55 secured thereto.

Referring now to Figs. 3, 4, 6, and 7, a pair of shafts 72 and 73 are vertically positioned pivotally between the platform 28 and the top frame 62. Each shaft 72 and 73 carries a spur gear 74 at its lower end to mesh with the peripheral teeth of the ring gear 39 so that as the ring gear 39 turns to revolve the cylinder 38, each shaft 72 and 73 is correspondingly revolved thereby.

The shaft 72 is passed through the cylinder elevating control housing 75 to drive through a suitable clutch and reversing mechanism enclosed therein (not shown) the transverse shaft 76 on which the cable drums 70 and 71 are secured. By appropriate operation of the control handle 77 the shaft 76 is revolved from off the vertical shaft 72 to turn the drums 70 and 71 to pull the cables 64 and 65 in either direction as may be required to raise or lower the plate 55 thereby lowering or elevating the cylinder 38. Also, by causing the cables to pull down on the plate 55, the cylinder 38 is positively carried downwardly into the earth, though in ordinary earth the weight of the cylinder 38 and attached parts is sufficient to cause the proper rate of feed downward of the cylinder 38.

The mechanism within the housing 75 is not shown, as such devices are common and well known to those versed in the art, and the exact details of its construction do not enter into my invention.

The shafts 72 and 73 are here shown as square in cross section. A ring gear 78 (Figs. 4 and 10) is carried and retained on the plate 55 so as to be free to revolve around the cylinder 38. This gear 78 is revolved by the spur gears 79 and 80 which are carried and retained on the plate 55 and through which slidingly pass the shafts 72 and 73, the gears 79 and 80 being revolved by reason of the square section of the shafts.

Two transverse shafts 81 and 82 are mounted on the same diametrical line across the top end of the cylinder 38, and have the bevel gears 83 and 84 secured thereto to mesh with the bevel teeth of the ring gear 78. As the vertical shafts 72 and 73 revolve with the turning of the cylinder 38, the ring gear 78 is revolved through the spur gears 79 and 80 at a rate faster than that of the turning of the cylinder 38 so that the transverse shafts 81 and 82, one revolving oppositely to the other, revolve at a relatively high speed.

The cylinder 38 has a central inner partition 85 substantially throughout its legnth so as to strengthen and divide the cylinder into two longitudinal compartments, each open at the top and bottom ends. Across the lower ends of these compartments are mounted two transverse idler shafts 86 and 87. In each of the compartments on each side of the partition 85, is passed a series of buckets 88 joined one to the other by links 89 (Fig. 16) down from the upper shafts 81 and 82 to and around the lower shafts 86 and 87 and back up, to and over the upper shafts 81 and 82 to form two separate elevating systems.

Referring to Figs. 16 and 17, each bucket 88 has an upper and a lower pair of ears 90 on the rear end of the bucket between which the links 89 are pivotally secured by the pins 92. A lug 93 projects backwardly from each side face of the bucket 88. On each of the top and bottom shafts 81, 82 and 86, 87, are secured a pair of wheels 94 spaced apart sufficiently to permit the links 89 to pass therebetween. Each wheel 94 has a plurality of notches 95 (here shown as three) formed in the adjacent inner faces back from the periphery and directed toward the center of the wheel. These notches 95 are so spaced as to receive therein the lugs 93 of the bucket 88, and, as the links 89 tie one bucket 88 to the two adjoining buckets, each bucket 88 (Fig. 16) is carried diametrically around the lower shafts 86 and 87 over the wheels 94 to cause the outer ends of the buckets 88 to dig into the earth without permitting the buckets to rock back from the diametrical line of its position on the wheel. In other words, the links 89 retain the bucket 88 against the wheels 94 to retain the lugs 93 fitted within the wheel notches 95, whereby, in effect, the bucket 88 during its travel under the wheels 94 becomes an integral part of the wheels 94. The revolution of the upper shafts 81 and 82 to turn the wheels 94 thereon positively drives the two bucket systems by reason of the lugs 93 engaging in the wheels 94.

The lower shafts 86 and 87 are located to carry the buckets 88 across the open end of the cylinder 38 so that the outer ends of the buckets 88 as they travel therearound may dig into the earth. The cylinder 38 is revolving around its vertical axis, at the same time the buckets 88 are coming down, scooping up the earth and carrying it upwardly, so that the line of contact of the bucket digging edges with the earth is a circle.

In addition to the digging action of the buckets 88, a cutter plate 96, Fig. 2, is attached to the bottom of the cylinder 38 so as to cut out beyond the cylinder wall sufficiently to give ample clearance for the cylinder 38 through the hole, the diameter of which is determined by the cutter plate 96. For extremely hard ground, a plurality of teeth or spikes 97 are secured to the under side of the plate 96 to loosen up the earth ahead of the contacting points with the earth by the bucket edges.

The dirt as loosened and scooped up by the buckets 88 is carried upwardly and as the buckets swing around over the top shafts 81 and 82, the dirt is dumped from the buckets into the annular pan 98 (Figs. 4 and 10) which is secured to the plate 55 and does not revolve. The cover 99 is secured to the cylinder 38 and revolves therewith, and serves as a guide to deflect the dirt into the pan 98. A plurality of vanes 100, here shown as two in number, are secured to the cover 99 so as to sweep around in the pan 98 as the cover 99 turns and carry the dirt dumped therein to the opening 101 under which is a spout 102 which directs the dirt outwardly from the cylinder 38.

Other means than the bucket system of elevating the dirt may be employed. Reference is made to Fig. 8, wherein is shown one such modified system. On the lower end of the cylinder 38 is mounted an auger-like cutter 103, Fig. 13, having the two cutting edges 104 and 105 with inclined planes 106 and 107 slanting upwardly therefrom to the horizontal plane surfaces 108 and 109. A shaft 110 is rotatably mounted vertically and centrally of the cylinder 38. This shaft 110 is driven through the spur gear 111 on its upper end by the spur gears 112 and 113 slidingly carried on but positively driven by the shafts 72 and 73, and the intermediate gears 118 and 119 (Fig. 19).

At a small distance above the plane surfaces 108 and 109 (both in the same plane), a disk 114 is secured to the shaft 110 to revolve therewith. The disk 114 (Fig. 11) has a horizontal plane surface 115 with an opening therethrough and an inclined plow share 116 depends from one side of the opening downwardly toward the surfaces 108 and 109. The cylinder 38 revolves at a determined rate of speed and dirt comes up the inclined planes 106 and 107 onto the surfaces 108 and 109. The shaft 110 revolves in the opposite direction to that of the cylinder 38 and at a higher rate of speed. The plow share 116 scoops into the dirt lying on the surfaces 108 and 109 and plows and kicks the dirt up onto the plane surface 115 of the disk 114.

At a small distance above the shaft disk 114, a cylinder disk 120 is secured to the cylinder 38 to revolve therewith over the disk 114, with the shaft 110 passing centrally therethrough. The cylinder disk 120 has an opening through it with a plow share 121 projecting downwardly therefrom in a direction opposite to that of the share 116. A slight clearance is left between the lower end of the share 121 and the surface of the disk 114 toward which it is directed. The combined motions of the disk 114 and the disk 120 causes the dirt coming up onto the disk 114 to be plowed up and kicked onto the disk 120. Disks 114 and 120 are alternately carried within the cylinder 38 as described on up to the top, where a scraper 122 (Fig. 9) carries the dirt reaching the uppermost disk off to the outer edge of the pan 123 where the dirt is dumped through an opening 124 into the chute 125.

In some instances, it is desirable to remove the earth in the form of a core, in which case, (Figs. 14 and 15) a hollow inner cylinder 127 is substituted for the shaft 110 (Fig. 8) and a cutter 128 is attached to the cylinder 38 to cut out the dirt in the annular space between the two cylinders 38 and 127.

At a short distance above the cutter 128, a disk 129 is secured to the cylinder 127 to revolve therewith. The disk 129 has an opening therethrough with an incline 130 hinged to one side of the opening to drop down and contact the cutter 128. A spring 131 pulls the incline 130 down toward the cutter. This incline 130 may be made an integral part (not shown) of the disk, in which case the entire disk and incline are made of spring steel.

As the cylinder 38 revolves, the cutter 128 brings dirt upwardly. The inner cylinder 127 revolves in the opposite direction to that of the cylinder 38, and the incline 130 drops down to scrape upwardly on the inclined faces of the cutter 128 so as to positively scrape the dirt upwardly. A disk 133 is secured to the cylinder 38 at a short distance above the disk 129 and it carries an incline 134 directed down onto the disk 129 in the opposite direction from that of the incline 130. The incline 134 is also pulled downwardly by a spring 135. As the disk 133 revolves oppositely to that of the disk 129, the incline 134 drops down onto the incline 130 to scrape upwardly thereover and onto the horizontal face of the disk 129.

A plurality of disks 129 and 133 are alternately spaced one above each other on up to the top of the cylinders 38 and 127, to have their respective inclines 130 and 134 spaced spirally around the cylinders so that as one incline comes to the top of the lower incline the second incline above the lower incline is ready to drop down to scrape up on the first named incline, and so on up the length of the cylinders.

While I have here described my invention in more or less minute detail, it is obvious that many structural changes therefrom may be made without departing from the spirit of the invention, and I, therefore, do not desire to be limited to the precise form as shown, nor any more than may be necessitated by the following claims.

What I claim as new is:

1. In a device for digging holes in the earth operated by a power unit, a supporting frame, a cylinder strengthened by a longitudinal central partition, a horizontal cylinder frame universally pivoted to the supporting frame, a ring supported by the frame, said cylinder being adapted to slide longitudinally through the ring, means associated with said frame and said ring to adjust and maintain the desired angle of the cylinder with the surface of the earth, a guide plate moving up and down with the cylinder, a ring gear on the cylinder carried by the said guide plate, said cylinder being free to slide through the ring gear, said ring gear being driven by said power unit, means permitting the ring gear to revolve said cylinder, a pair of earth elevating mechanisms within the cylinder one on each side of the partition, gear means carried at the top of the cylinder to simultaneously operate both of said elevating mechanisms, and shaft means for conveying power from said ring gear to said gear means.

2. In a device for digging holes in the earth operated by a power unit, a frame, a ring universally pivoted to the frame, a tower extending vertically from the ring, adjusting means for fixing the angle of the tower with the frame by rocking the ring, a cylinder adapted to travel longitudinally of the tower and through the ring, a ring gear slidingly passed over the cylinder and revolvably retained on the ring, means permitting said ring gear to revolve said cylinder as it slides therethrough, power transmission means between said power unit and said gear, an upper cylinder guide plate swivelly retained on and supporting said cylinder and guided longitudinally by said tower, means engaging said upper plate to raise and lower said cylinder, a shaft longitudinally disposed in said tower, said shaft being driven by said ring gear, a second ring gear about said cylinder carried by said upper plate, a spur gear engaging said second ring gear and carried on said plate, said shaft driving said spur gear and slidingly passing therethrough, earth elevating means within the cylinder, said elevating means being actuated by said second ring gear.

3. In a device for digging holes in the earth operated by a power unit, a supporting frame, a plate universally pivoted on said frame and normally lying in a horizontal plane a tower carried on the plate, a cylinder within the tower vertically guided through said plate, a top guide carried by and at the top of said cylinder slidingly guided within said tower and held against rotation, a ring gear revolvably carried on said plate with said cylinder slidingly passing therethrough, means permitting said ring gear to revolve said cylinder as it slides therethrough, means within said cylinder for elevating dirt as said cylinder revolves, a dirt receiving pan around said cylinder supported from the top guide above the cylinder and adapted to travel vertically therewith but fixed against rotation, a discharge spout from the pan, an arm sweeping around said pan by attachment to said cylinder carrying the dirt to said spout, power transmission means between said unit across said frame to said ring gear on said plate, and means for rocking said plate in relation to said frame.

In testimony whereof I affix my signature.

WALTER RHODES.